United States Patent

[11] 3,628,032

| [72] | Inventors | Robert A. Senior<br>Uppingham, Rutland;<br>Peter J. Trigg, Corby, Northamptonshire,<br>both of England |
|---|---|---|
| [21] | Appl. No. | 838,301 |
| [22] | Filed | July 1, 1969 |
| [45] | Patented | Dec. 14, 1971 |
| [73] | Assignee | Stewarts and Lloyds Limited<br>Glasgow, Scotland |

[54] APPARATUS FOR DETECTING OBJECTS
3 Claims, 3 Drawing Figs.

[52] U.S. Cl. ...................................... 250/219LG,
250/220, 250/235, 356/156
[51] Int. Cl. .......................................... G01n 21/30
[50] Field of Search .......................................... 250/221,
222, 223, 219 WD, 219 LG, 220, 231, 235;
356/157, 158, 163; 209/111.7

[56] References Cited
UNITED STATES PATENTS

| 1,998,950 | 4/1935 | Cockrell .................... | 250/219 |
| 2,548,590 | 4/1951 | Cook ......................... | 200/219 |
| 2,994,784 | 8/1961 | White et al. ............... | 200/219 |
| 3,360,654 | 12/1967 | Muller ....................... | 250/236 |
| 3,303,347 | 2/1967 | Wingate .................... | 250/231 |

Primary Examiner—James W. Lawrence
Assistant Examiner—D. C. Nelms
Attorney—Brady, O'Boyle & Gates ABSTRACT: Apparatus for detecting an object which has a rotating mirror and photocells arranged to scan two parallel paths, amplifiers and pulse shapers for processing signals produced by the photocells in response to variations in radiation along the paths, and a logic circuit for comparing the signals.

APPARATUS FOR DETECTING OBJECTS

The present invention relates to apparatus for detecting an object.

Detection of objects is sometimes required for tracking and length or speed measuring systems, for example in a steel bar rolling mill for detecting bars leaving a mill.

It has previously been proposed to detect the presence of a hot radiant object, or interruption by an object of a beam of radiation, by means of a detecting apparatus having a single stationary sensor. However, this previously proposed detecting apparatus is capable of providing only very little information about the object.

The present invention provides apparatus for detecting an object, the apparatus comprising means for scanning two adjacent parallel paths and means for producing, in response to variations in radiation along each path, signals respectively associated with said paths.

The invention will be more readily understood from the following description of an embodiment thereof given by way of example with reference to the accompanying drawings in which.

Figure 1:
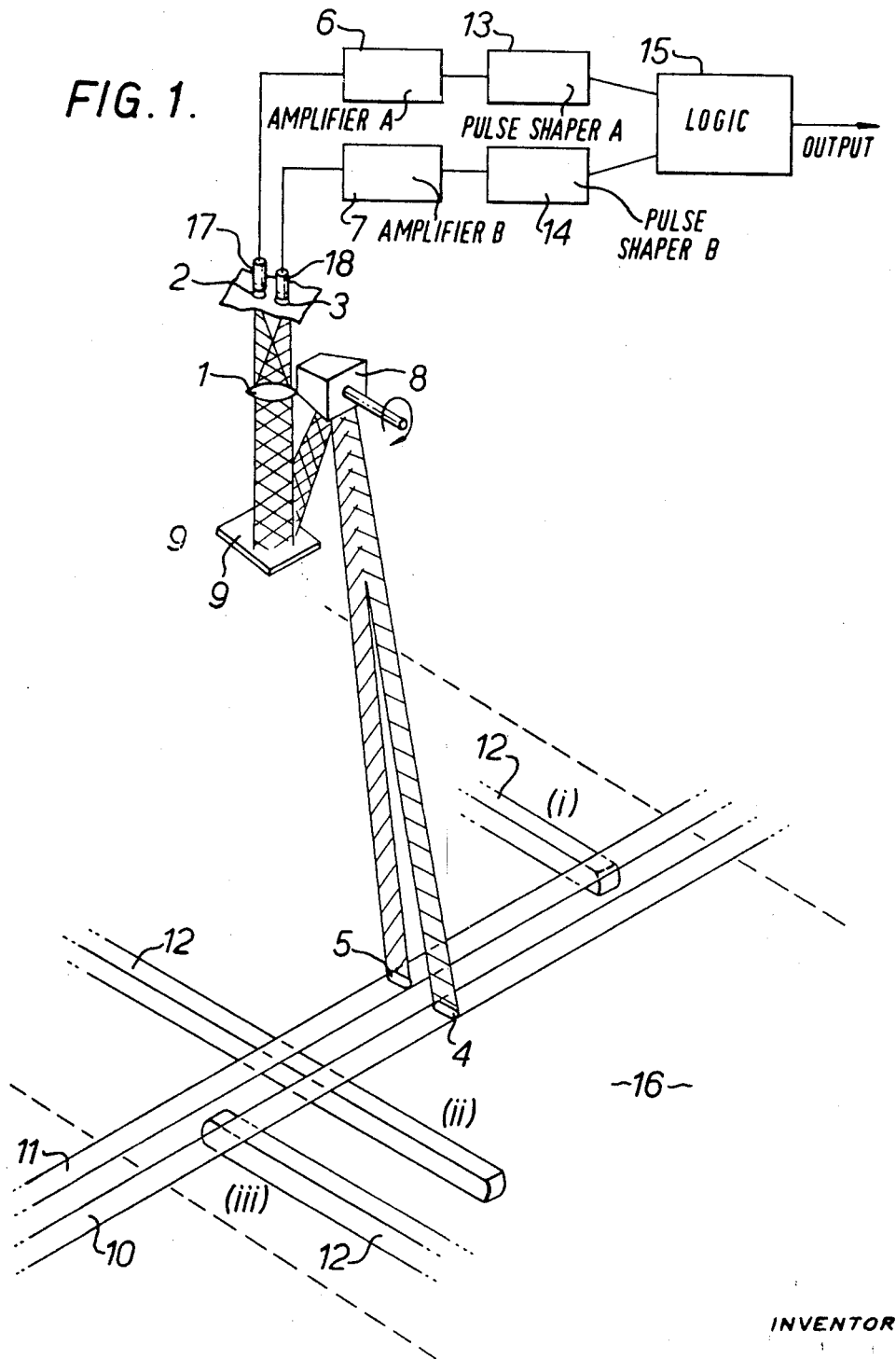
FIG. 1 shows diagrammatically an apparatus according to one embodiment of the invention for detecting an object.

Referring to FIG. 1, a lens 1 is used to focus an image of two small areas 4 and 5 of a roller table 16 (indicated in dotted lines) through two apertures 2 and 3 respectively. Behind these apertures are two photoelectric devices 17 and 18 respectively whose electrical response is proportional to the amount of radiation coming through the apertures, i.e., to the radiation from the two small areas of the roller table under examination. Photoelectric devices 17 and 18 are connected respectively to amplifiers 6 and 7 and the outputs of the two amplifiers 6 and 7 are passed respectively to pulse shapers 13, 14 and thence to a logic unit 15. The photoelectric devices 17 and 18 are conveniently photodiodes each connected in the biasing circuit of the associated amplifier 6 or 7. The amplifiers 6 and 7 are conventional AC pulse amplifiers designed to supply an output voltage when the resistance of the associated photodiode 17 or 18 falls sufficiently, i.e., when a sufficient quantity of radiation impinges on the photodiode. The two small areas of the roller table exposed to the photodiodes 17, 18 are constantly changed along paths 10 and 11 respectively transversely of the roller table by scanning means in the form of a rotating four-sided mirror 8 which reflects the images onto a fixed mirror 9 which in turn reflects the images to the lens 1. The paths 10 and 11 may overlap each other slightly.

If a red-hot bar 12 is in position (i) relative to the paths scanned there is sufficient radiation directed from the bar 12 to the photodiode 18 to produce an output signal from the amplifier 7 while there is insufficient radiation directed to the photodiode 17 to produce an output signal from the amplifier 6. As radiation from the bar 12 impinges intermittently on the photodiode 18 due to the rotation of the mirror 8, the output signal from the amplifier 7 is a series of pulses.

If a bar 12 is in position (ii) relative to the scanned paths 10 and 11 both amplifiers 6 and 7 will produce an output signal. Similarly with a bar in position (iii) only the amplifier 6 will produce an output signal.

The unit 15, using conventional electronic logic techniques, can detect whichever of the three above conditions (i, ii, or iii of FIG. 1) is desired.

Figure 2:
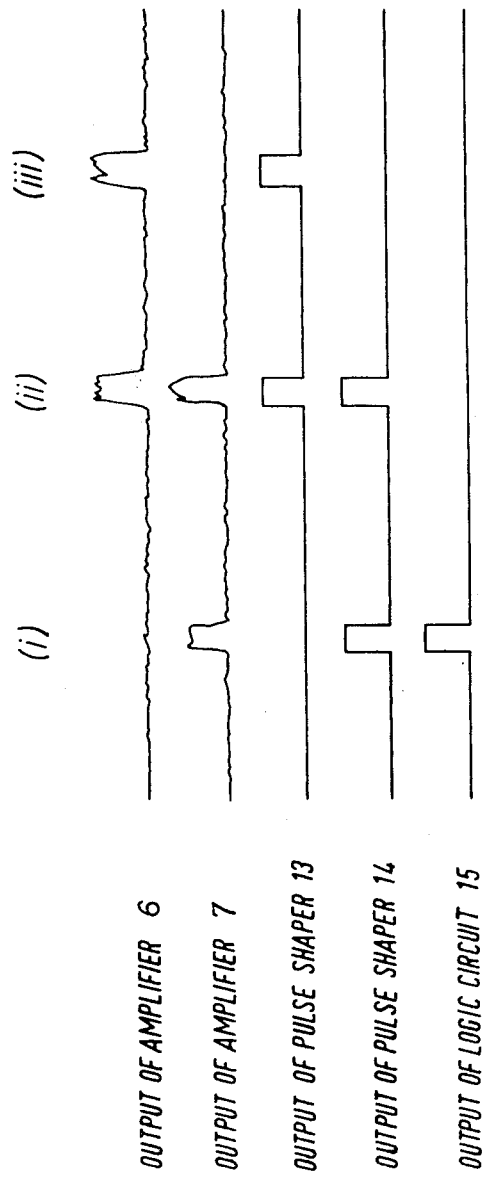
FIG. 2 is a graphic representation of signals produced in the apparatus of FIG. 1.
Figure 3:
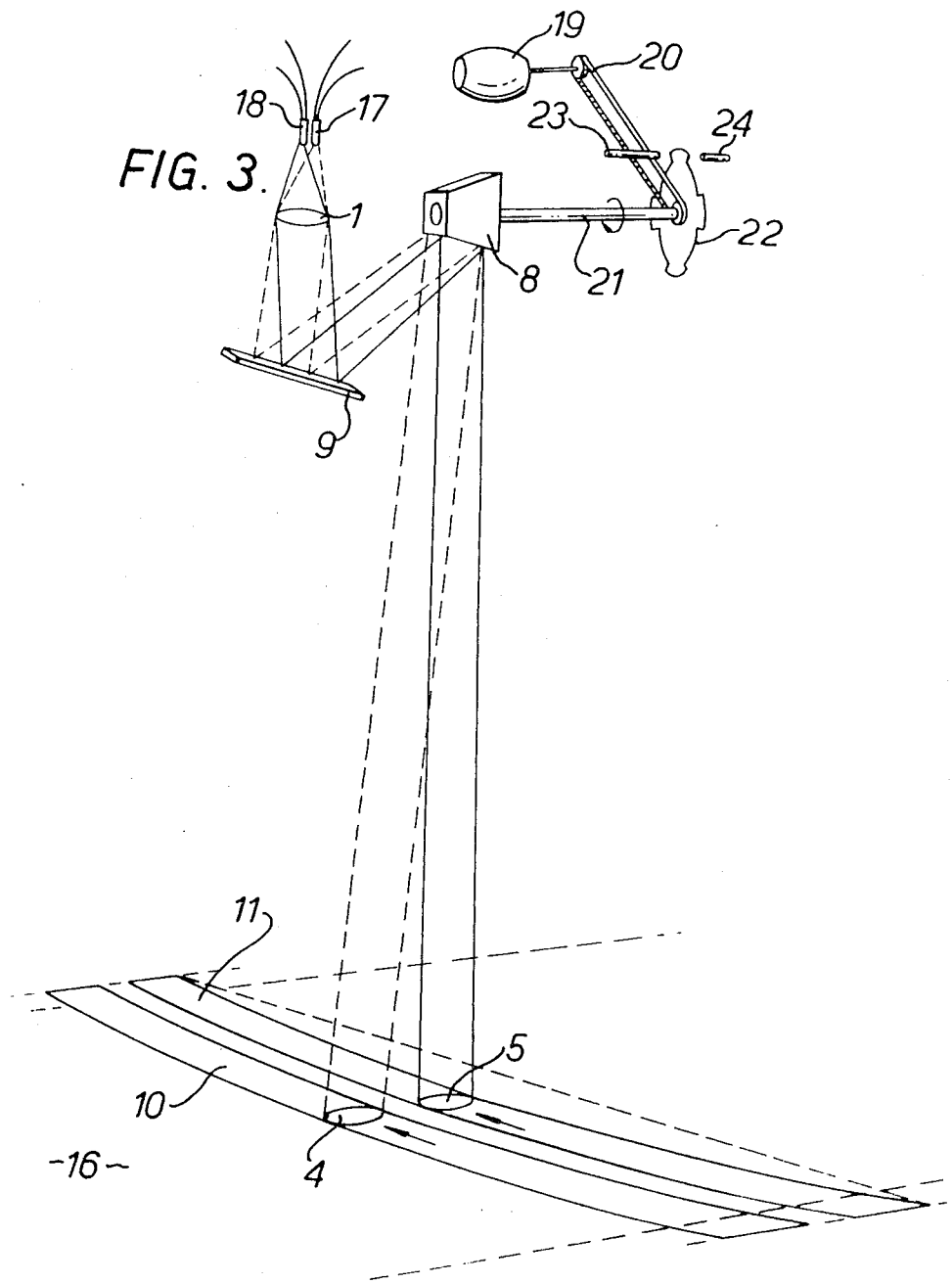
FIG. 3 is a view similar to FIG. 1 but showing the apparatus from a different angle.

For example, if it is desired to detect the front end of a bar, (condition i) the output of the logic unit would be as shown in FIG. 2. It should be noted that in this case the device would ignore any bars in positions (ii) or (iii) of FIG. 1, i.e., the device would detect the front of a bar even if the other bars are lying in the path scanned. At (i), (ii) and (iii) in FIG. 2 are shown the signals by the amplifiers 6, 7 the pulse shapers 13, 14 and the logic unit 15 in response to objects at positions (i), (ii), and (iii) respectively of FIG. 1.

The pulse shapers 13 and 14 and the logic unit 15 may conveniently be combined in a logic circuit comprising MEL series 10 circuit blocks arranged (for condition 1) to produce an output only if the amplifier 7 is at logic '1' and the amplifier 6 is at logic '0.' The logic circuit is provided with a delay circuit delaying for 40μ sec. the output signal, so that in the event of the photodiode 18 being less sensitive than the photodiode 17 and hence the leading edge of the output pulses of the amplifier 7 lagging the leading edge of the output pulses of the amplifier 6, a false detection is prevented.

Compared with previously proposed detecting devices having a single stationary sensor, which are unable to distinguish one sensed object from another or to provide any information as to the shape or position within the sensors field of view of a sensed object, the above-described embodiment of the present invention, by scanning two paths and processing the resultant information as described above, may be used for example to detect the presence of one or more stationary or moving objects and the end of one or more of the objects, and may form part of a system for measuring the length of a longitudinally moving hot radiant steel bar leaving a steel bar rolling mill, even if other similar bars are lying parallel to it in the scanned region.

The above-described embodiment was devised primarily to detect red hot bars using the red and infrared radiation emanating from them.

We claim:

1. Apparatus for detecting an end of an elongate radiation-emitting object traveling along a path adjacent other such elongate radiating objects, comprising rotatable mirror means for simultaneously scanning transversely of said path of travel of said elongate radiating object a first path and a second path extending adjacent and parallel to said first path, first radiation responsive means and second radiation responsive means connected to receive radiation reflected by said rotatable mirror means respectively from said first and second paths, said first and second radiation responsive means being adapted to provide signals in response to variations in radiation along said first and second paths caused by the presence or absence of said elongate radiating object thereon, and circuit means for comparing said signals and thereby providing an output signal indicative of the presence of said object in only one of said first and second paths to provide an indication of the passing of an end of the elongate radiating object along said path.

2. Apparatus as claimed in claim 1, wherein said circuit means comprise first and second amplifiers respectively connected to said first and second radiation responsive means, first and second pulse shapers respectively connected to the outputs of said first and second amplifiers, and logic circuit means for comparing the outputs of said pulse shapers to provide said output signal.

3. A method of detecting an end of an elongate radiation-emitting object traveling along a path adjacent other such elongate radiation emitting objects, comprising the steps of simultaneously scanning first and second adjacent parallel paths transverse of the path of travel of the radiating object, sensing variations in radiation along said first and second paths, comparing said variations, and providing an output signal indicative of the presence of an end of the elongate radiation-emitting object when radiation from said object is sensed in only one of said first and second paths.

* * * * *